Figure 4:
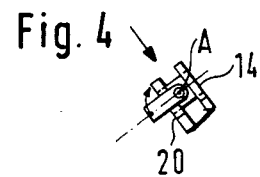

United States Patent [19]

Schnell et al.

[11] Patent Number: 4,761,854

[45] Date of Patent: Aug. 9, 1988

[54] SUSPENSION DEVICE FOR STRINGS OF SAUSAGE LINKS

[75] Inventors: Karl Schnell, Winterbach; Miroslav Domlatil, Schorndorf, both of Fed. Rep. of Germany

[73] Assignee: Karl Schnell Maschinenfabrik, Winterbach, Fed. Rep. of Germany

[21] Appl. No.: 917,182

[22] Filed: Oct. 9, 1986

[30] Foreign Application Priority Data

Oct. 12, 1985 [DE] Fed. Rep. of Germany ....... 3536460

[51] Int. Cl.$^4$ ............................................. A22C 15/00
[52] U.S. Cl. ..................................... 17/1 R; 17/44.4; 17/35
[58] Field of Search .................. 17/1 R, 1 F, 44.4, 33, 17/34

[56] References Cited

U.S. PATENT DOCUMENTS

| 4,547,931 | 10/1985 | Staudenrausch et al. | 17/44.4 X |
| 4,612,684 | 9/1986 | Kollross | 17/1 F X |
| 4,644,607 | 2/1987 | Sziede | 17/44.4 X |

FOREIGN PATENT DOCUMENTS 2744350 4/1979 Fed. Rep. of Germany ....... 17/44.4
3202026 8/1983 Fed. Rep. of Germany ....... 17/44.4

Primary Examiner—Willie G. Abercrombie
Attorney, Agent, or Firm—Toren, McGeady & Associates

[57] ABSTRACT

To achieve automatic removal of a sausage link string 6 from a feeding device 3, 4 and to attain a delivery to curing rods 11, hooks 7 are supported at a revolving moving chain 8 to be rotatable in their longitudinal axis and to be pivotable transversely to the chain longitudinal direction. By means of appropriate control devices in the form of a rotary lever 18 which coacts with a control edge 20 and a disk 23, and a block-shaped guide link 19, which rests upon a guide rail 21, the hook 7 is moved into its different positions. Herein the hook 7 is in its lowermost pivoting position during reception of the individual loops of the sausage link string 6, and the bent-over hook end 16 is oriented towards the front in conveyance direction and grips a loop from beneath. In the delivery position the hook 7 is moved toward the top by the curing rods 11 which remove the sausage link string 6 and rotates therein in such a manner around its longitudinal axis that the hook end 16 is oriented towards the bottom and releases the sausage link string 6.

15 Claims, 2 Drawing Sheets

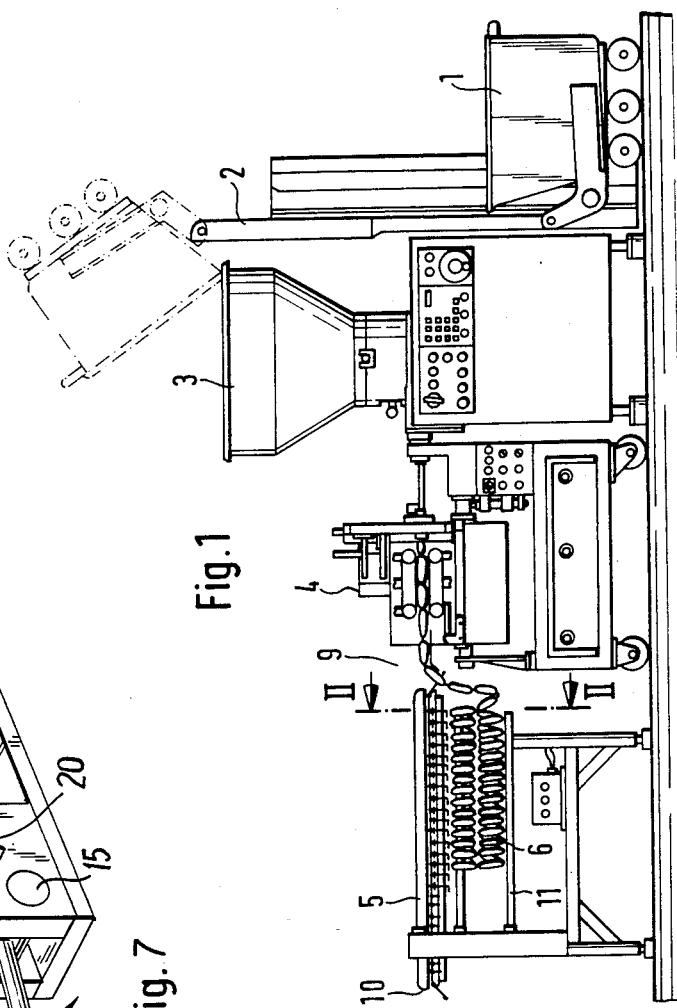
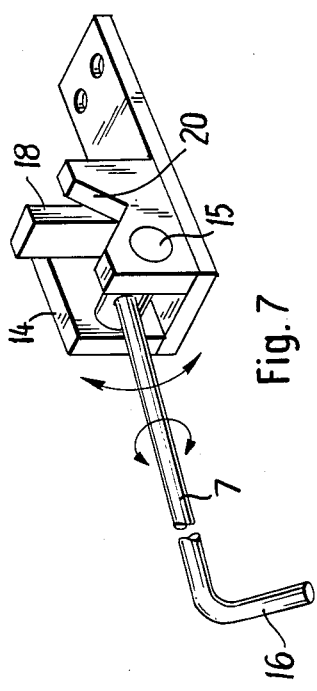
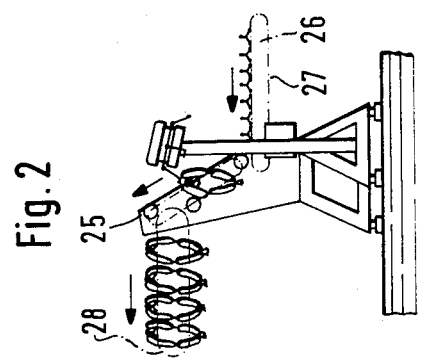

SUSPENSION DEVICE FOR STRINGS OF SAUSAGE LINKS

The invention is directed to a suspension device for strings of sausage links with a revolving endless chain, band or the like. Such a device is already known from the U.S. Pat. No. 3,353,459. Here at appropriate spacing hooks are rotatably supported at the endless chain so as to be rotatable around their own axis. Under the action of springs arranged on them, the hooks protrude respectively into a predetermined direction. In this position they grip the sausage link strings from beneath, said sausage link strings being fed by a tie-off device. The removal of the sausage link strings occurs by means of a curing rod, wherein the hooks then rotate in such a manner, because of the action of the curing rods, so that the sausage link string is passed on to the rod. It has been shown to be a disadvantage in such a device that only a horizontal plane of revolution of the hook chain can be used. Apart from that, the rotational motion of the hooks alone is often insufficient in order to achieve a satisfactory release of the sausage link string from the hooks. It can therefore occur that portions of the sausage link string remain hanging on the hooks and have to be pushed over by hand onto the curing rod. Such devices are therefore unsuitable for a completely automatic sequence of operation.

It is the task of the present invention to create a suspension device of the type described above, in which not only the transfer from the tie-off apparatus to the device, rather also from said device to the curing rod can be accomplished automatically without any handling being required. This is achieved in the invention in a device with hooks rotatably supported on their longitudinal axis in that the hooks are arranged to be additionally pivotable approximately transversely to the chain longitudinal direction, wherein control apparatus for pivoting and rotation of the hooks into a receiving and a delivery position are provided. Because of this simultaneous rotatability and pivotability the hooks can be moved into explicitly defined receiving and delivery positions, so that hangups of individual portions of the sausage link string can be avoided. Apart from that, just as is the case in the device described above, particularly simple hooks can be used, which at the free end exhibit merely a bend-off of approximately 90°.

The rotatable and pivotable fastening of the hooks at the chain occurs preferably by interposing of a bearing bracket, which, in order to avoid a sagging of the chain, is guided alongside of same upon a support rail.

For its control the hook exhibits a guide link between its free and its articulated end coacting with a guide rail arranged alongside of the chain. By means of the guide rail among other things the pivot position of the hook can be observed or changed. It is particularly appropriate to design the guide link as a block, whose longitudinal axis extends approximately parallel to the bent-off end of the hook.

As an additional control means a rotary lever is non-rotatably fastened behind the articulated end of the hook, which coacts with the control edge of the bearing bracket in such a manner that if the free end of the hook is lifted there occurs a rotation of the hook through approximately 90° around its longitudinal axis. For certain purposes it can be favorable if the bearing bracket exhibits a stop for the pivoting movement of the hook coacting with the rotary lever. The rotary lever extends preferably in the opposite direction from the bent-off hook end.

In accordance with a further characteristic of the invention a disk is provided at the feed side of the reversal point of the chain, said disk being located above the bearing brackets for the hooks, said disks being designed as a pivoting stop and as a guide for the rotary lever of the hook. Each time when the rotary lever of a hook runs up on the disk, it is pivoted towards the bottom, whereby the hook moves into the receiving position and is maintained in this position at least for as long, until the rotary lever has left the effective range of the disk. By this rotation of the hook around its longitudinal axis simultaneously the guide link is rotated into a position parallel to the guide rail, so that the hook is pivoted into its lower receiving position.

The chain drive sprocket is driven intermittently through a ratchet wheel with a ratchet in particular by an pneumatic actuating cylinder. In the course of this there occurs each time a further advance of the chain by spacing of one hook. The control of the drive occurs appropriately either by means of the filling machine or by the tie-off device. Also the removal by means of the curing rods is completely automatic by means of a lifting device for the curing rods arranged at the end of the suspension device opposite to the sausage reception. As soon as the sausage link chain is finished, the appropriate curing rod moves toward the top, removes herein the sausage link chain from the hooks, wherein said rod pivots these towards the top. Since during this pivoting movement there occurs simultaneously a rotation of the hook around its longitudinal axis because of the rotary lever, the sausage link string slides necessarily from the hook ends, wherein a hang-up of individual sausage link string parts is completely excluded. Preferably a magazine with conveyor belt and a device for further conveyance is provided for the curing rods.

Figure 3:
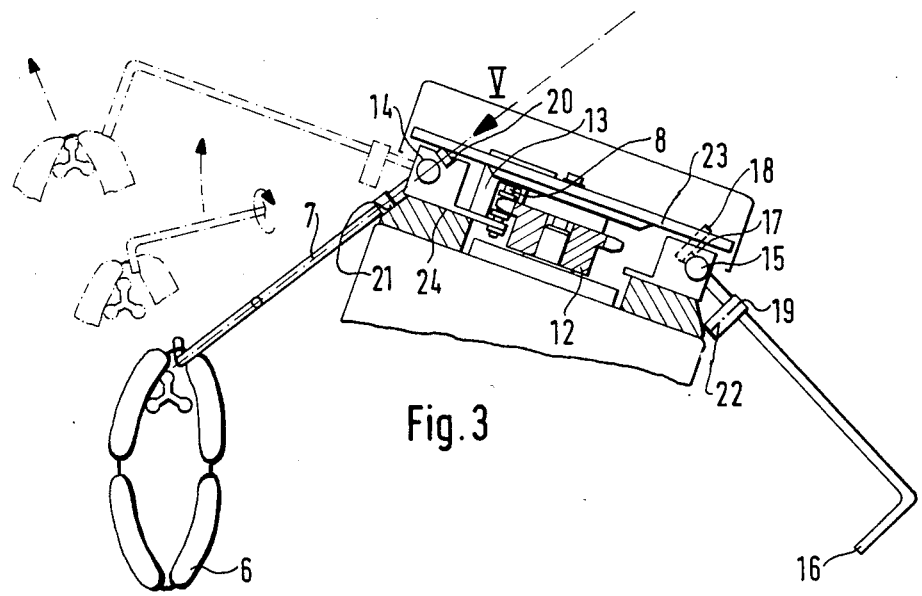
Figure 5:
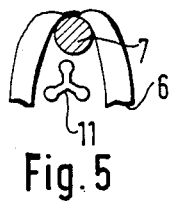
Figure 6:
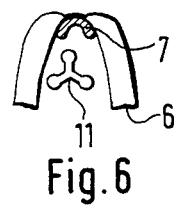

The drawing shows an embodiment example of the invention. It is shown on:

FIG. 1 is a side view of an installation, consisting of a filling machine, a tie-off device and a suspension device, FIG. 2 is a front view of the suspension device, FIG. 3 is a section along II—II in FIG. 1 on an enlarged scale with additional positions of the hook shown in broken dotted lines, FIG. 4 is a view V in FIG. 3, and FIGS. 5 and 6 are each a portion from FIG. 3 with a different cross-sectional shape of the hook, and FIG. 7 is a perspective view of the hook and its bearing bracket.

The not-depicted sausage meat is conveyed in the carriage 1 to the lifting device 2 and dumped by same into the filling machine 3, as the broken dotted line illustration of the carriage shows. From here the sausage meat is further conveyed into the proportioning- and tie-off device 4. This device ejects the sausages in string shape and delivers them to the suspension device 5. Herein the sausage string is suspended at hooks 7 in spiral fashion in loops hanging downwards, said hooks being suspended at an endless chain 8. At the end 10 of the suspension device 5 which is opposite the receiving side 9 the sausage link strings 6 are removed from the curing rods 11.

The chain 8 is wound around a chain sprocket wheel 12 at the feed side end 9 of the suspension device 5 and at the opposite side 10 there is located a corresponding chain reversing wheel which is not depicted in greater detail. The drive of the sprocket wheel 12 occurs in a non-depicted manner by a pneumatic actuating cylinder which actuates a ratchet, which on its part engages with a ratchet wheel connected with the sprocket wheel 12. In this manner there occurs at intermittent actuation of the chain 8, wherein the travel amounts respectively to the spacing between two hooks 7. The control of the drive occurs herein either by the filling machine 3 or the tie-off device 4. A special guide 13 is additionally provided for the chain.

A bearing bracket 14 is provided for each hook at the chain 8, whose construction can be seen particularly in the FIGS. 3, 4 and 7. A bolt 15 is rotatably supported at each bearing bracket 14, said bolt being provided with a lateral bore. In this lateral bore a hook 7 is arranged to be rotatable about its longitudinal axis. Said hook can thus be pivoted or rotated with respect to the bearing bracket 14 or the chain 8. The hook end 16 is simply bent over through 90° with respect to the hook 7. In addition, the hook 7 exhibits a rotary lever 18 secured at the hook end 17 lying opposite to its hook end 16 and between the bolt 15 and the hook end 16 it exhibits a guide link 19, which is constructed as a block. The rotary lever 18 is secured to the hook so that it rotates the hook and coacts with a control edge 20, note FIG. 7, in such a way that if the hook 7 is lifted there occurs simultaneously a rotation around its longitudinal axis, wherein the rotary lever 18 moves from the position illustrated on the left hand side of FIG. 3 into the position illustrated on the right side. Since the rotary lever 18 extends in opposite direction as the hook end 16, the hook end 16 is then directed downwards. The guide link 19 is supported upon a guide rail 21 extending alongside the chain 8 and is pivoted from the position shown in the left hand side of FIG. 3 into that shown on the right hand side of said Figure if the hook 7 is rotated around its longitudinal axis. Herein the longitudinal axis 22 extends approximately in direction of the hook end 16. A disc 23 is provided above the chain drive sprocket 12 and above all above the bearing brackets 14, which disk coacts with the rotary lever 18.

The functional mode of the suspension device 5 is as follows. As the hook depicted in solid lines on the left hand side of FIG. 3 shows, the hook is in its lowest pivoting position and the hook end 16 is oriented towards the front in movement direction of the chain 8, so that thus the appropriate loop of the sausage link string is gripped from below and carried along. Because of contact of the blood-like guide link 19 upon the guide rail 21 the hook 7 remains in this position. As soon as the sausage link string is completely suspended, the chain conveyance 8 is stopped. This interval is additionally utilized in order to slide non-depicted sausage skin tube onto the tie-off device 4. Simultaneously the curing rod 11 located between the loops of the sausage link string 6 moves outwardly towards the top, whereby it grips the loop of the sausage link string 6 from beneath and lifts same up. Through this the hook 7 is also pivoted into the first intermediate position depicted in FIG. 3, so that the guide link 19 is lifted off the guide rail 21. The rotary lever 18 which is supported at the control edge 20 is pivoted into the upper position depicted in broken dotted lines in FIG. 3 during this motion, so that the hook end 17 points towards the bottom and releases the corresponding loop of the sausage link string 6. Subsequently, there is again a lowering, wherein the guide link 19 now is supported in vertical position upon the guide rail 21, until during the return motion the rotary lever 6 runs up upon the disk 23. This causes again a backward rotation of the hook, the guide link 19 lies again in a flat position upon the guide rail 21 and the next sausage link string can be grasped. In order to avoid sagging of the chain 8 the bearing blocks 15 are supported upon a carrier rail 24, which is integral with the guide rail 21.

As is discernible from FIG. 2, the removal occurs also completely automatically by the curing rods 11. For this purpose a lifting device 25 for the curing rods 11 is provided which lifts same outwardly obliquely towards the top, so that as has been described above, the sausage link string 6 can be removed from the hooks 7. In the bottom section a curing rod magazine 26 is provided, which exhibits a conveyor belt, which feeds the curing rods 11 to the lifting device 25. In the upper portion an additional conveyor belt 28 is arranged which serves for receiving of the curing rods 11 carrying the sausage link strings.

The FIGS. 5 and 6 show different cross-section shapes of the hooks wherein in FIG. 5 a circular cross-section is selected, while in FIG. 6 the cross-section is shaped in a stirrup fashion.

We claim:

1. Suspension device (5) for sausage link strings (6) with a revolving endless chain-like or band-like conveyor member, having a longitudinal direction and hooks (7) each having a long leg with a first end mounted on said endless conveyor member and a second end extending outwardly from said endless conveyor member, said long leg having a longitudinal axis and being rotatable around the longitudinal axis, and a short leg extending transversely of said long leg at the second end thereof and forming a hook end (16) characterized in that the hooks are arranged to be pivotable approximately transversely to the conveyor member longitudinal direction, and control devices (18, 19, 20, 21, 23) are provided for pivoting and rotating the hook ends of the hooks (7) into a receiving and a delivering position.

2. Device according to claim 1, characterized in that the hook ends (16) of the hooks (7) are bent off through approximately 90° relative to said long legs.

3. Device according to claims 1 or 2, characterized in that a bearing bracket (14) is attached at the conveyor member (8) and the hooks (7) are mounted in the bearing brackets to be rotatable and pivotable.

4. Device according to claim 3, characterized in that a support rail (24) for supporting the bearing brackets (14) is provided alongside said conveyor member.

5. Device according to claim 3, characterized in that the hooks 7 between the hook end (16) and the firt end of said long leg have a guide link (19) coacting with a guidance rail (21) arranged alongside the chain (8).

6. Device according to claim 5, characterized in that the guide link (19) is designed as a block having a longitudinal axis (22) extending approximately parallel to the bent-off hook end (16).

7. Device according to claim 5, characterized in that said hook (7) is articulated adjacent the first end thereof, a rotary lever (18) is non-rotatably fastened at the first end of said hook on the opposite side where the hook is articulated from the second end thereof said rotary lever coacting with a control edge (20) of the bearing bracket (14) in such a way that, if the hook end (16) is lifted, a rotation of the hook (7) around its longitudinal axis through approximately 90° occurs.

8. Device according to claim 7, characterized in that the bearing bracket (14) exhibits as top for the pivoting motion of the hook (7) coacting with the rotary lever (18).

9. Device according to claim 8, characterized in that the rotary lever (18) extends in the direction opposed to the bent-off hook end (16).

10. Device according to claim 9, characterized in that a disk 23 is provided at a chain reversal point (9) on a receiving side arranged above the bearing brackets (14), which disk is constructed as a pivoting stop and as a guide for the rotary lever (18) of the hook (7).

11. Device according to claim 3, characterized in that said hooks are in spaced relation, and the chain-drive spocket (12) is intermittently driven in increments based on the spaced relation of said hooks, wherein each increment of movement of the conveyor member equals the spaced relation between two adjacent hooks.

12. Device according to claim 1, including a filling machine (3) and a tie-off device (4) characterized in that one of the filling machine and the tie-off device controls the drive of the suspension device (5).

13. Device according to claim 11 characterized by said suspension device (5) includes curing rods (11) for the sausage link strings, and a lifting device (25) for lifting said curing rods within said suspension device.

14. Device according to claim 13, characterized in that the lifting device (25) extends outward obliquely relative to said conveyor belt.

15. Device according to claim 14, characterized in that the lifting device (25) is connected with a curing rod magazine (26) including a conveyor belt (27) and a device for further conveyance 28.

* * * * *